US008924362B2

(12) United States Patent
Nath

(10) Patent No.: US 8,924,362 B2

(45) Date of Patent: Dec. 30, 2014

(54) B-FILE ABSTRACTION FOR EFFICIENTLY ARCHIVING SELF-EXPIRING DATA

(75) Inventor: Suman Kumar Nath, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1062 days.

(21) Appl. No.: 12/165,466

(22) Filed: Jun. 30, 2008

(65) Prior Publication Data

US 2009/0327376 A1 Dec. 31, 2009

(51) Int. Cl.

| | |
|---|---|
| ***G06F 7/00*** | (2006.01) |
| ***G06F 17/00*** | (2006.01) |
| ***G06F 3/06*** | (2006.01) |

(52) U.S. Cl.

CPC .............. *G06F 3/064* (2013.01); *G06F 3/0679* (2013.01); *G06F 3/0616* (2013.01)

USPC ............................ 707/689; 707/737; 707/791

(58) Field of Classification Search

CPC .......... G06F 17/30946; G06F 12/0223; G06F 12/023; G06F 12/0246

USPC .................. 707/689, 737, 791, 819, 999.001, 707/999.206

See application file for complete search history.

(56) References Cited

U.S. PATENT DOCUMENTS

| | | | | |
|---|---|---|---|---|
| 4,888,691 A * | 12/1989 | George et al. | 714/15 |
| 5,392,415 A * | 2/1995 | Badovinatz et al. | 718/100 |
| 5,418,752 A | 5/1995 | Harari et al. | |
| 5,794,253 A * | 8/1998 | Norin et al. | 707/203 |
| 5,809,558 A * | 9/1998 | Matthews et al. | 711/173 |
| 6,012,064 A | 1/2000 | Gibbons et al. | |
| 6,115,708 A | 9/2000 | Fayyad et al. | |
| 6,279,069 B1 * | 8/2001 | Robinson et al. | 711/103 |
| 6,304,948 B1 | 10/2001 | Motoyama et al. | |
| 6,381,628 B1 * | 4/2002 | Hunt | 709/201 |
| 6,449,625 B1 | 9/2002 | Wang | |

(Continued)

FOREIGN PATENT DOCUMENTS

WO WO2007100197 9/2007

OTHER PUBLICATIONS

Using Total Recall http://www.oracle.com/technology/obe/11gr1_db/security/flada/flada.htm. Last accessed Apr. 30, 2008, 8 pages.

(Continued)

*Primary Examiner* — Marc Somers

(74) *Attorney, Agent, or Firm* — Steve Wight; Judy Yee; Micky Minhas

(57) ABSTRACT

Systems and methods are provided for data processing and storage management. In an illustrative implementation an exemplary computing environment comprises at least one data store, a data processing and storage management engine (B-File engine) and at least one instruction set to instruct the B-File engine to process and/or store data according to a selected data processing and storage management paradigm. In an illustrative operation, the illustrative B-File engine can generate a B-File comprising multiple buckets and store sample items in a random bucket according to a selected distribution. When the size of the B-FILE grows to reach a selected threshold (e.g., maximum available space), the B-File engine can shrink the B-File by discarding the largest bucket. Additionally, the B-File engine can append data to existing buckets and explicitly cluster data when erasing data such that data can be deleted together into the same flash block.

19 Claims, 8 Drawing Sheets

300

310 L 305 L+1 315 L+2 L+N-1 L+N L+N+1 320

$B_1$ $B_2$ $B_3$ $B_N$ $B_T$

600

605 Cluster Items With Same Level (Expiration Intensity) In Same B-File Application Buckets 610 Map First Application Bucket To The First B-File Bucket 615 Append New Items Into The Tail Bucket Or Corresponding Individual Bucket 620 Maintain In-Memory Page Of Recently Inserted Items 625 B-File Bucket Full ?

Yes

No

630 Append Recently Inserted Items To The Block Associated With The Buckets

(56) References Cited

U.S. PATENT DOCUMENTS

| | | | | |
|---|---|---|---|---|
| 6,519,604 | B1 | 2/2003 | Acharya et al. | |
| 6,988,108 | B2 | 1/2006 | Bernhardt et al. | |
| 7,024,401 | B2 | 4/2006 | Harper et al. | |
| 7,028,054 | B2 | 4/2006 | Harper et al. | |
| 7,155,560 | B2 | 12/2006 | McGrew et al. | |
| 7,203,792 | B2 | 4/2007 | Lou et al. | |
| 7,325,052 | B1 | 1/2008 | Motoyama | |
| 7,353,350 | B2 * | 4/2008 | Klassen et al. | 711/159 |
| 7,360,096 | B2 | 4/2008 | Bracewell et al. | |
| 8,001,320 | B2 * | 8/2011 | Sokolov et al. | 711/104 |
| 8,352,519 | B2 | 1/2013 | Nath | |
| 2006/0072400 | A1 * | 4/2006 | Anderson et al. | 369/47.1 |
| 2006/0106852 | A1 * | 5/2006 | Siddall et al. | 707/101 |
| 2006/0155943 | A1 * | 7/2006 | Todd et al. | 711/161 |
| 2007/0113029 | A1 | 5/2007 | Bennett et al. | |
| 2007/0113031 | A1 * | 5/2007 | Brown et al. | 711/160 |
| 2007/0204141 | A1 | 8/2007 | Yamaguchi et al. | |
| 2008/0059540 | A1 | 3/2008 | Brown et al. | |
| 2008/0065815 | A1 | 3/2008 | Nasu et al. | |
| 2009/0327376 | A1 | 12/2009 | Nath et al. | |
| 2010/0030809 | A1 | 2/2010 | Nath et al. | |

OTHER PUBLICATIONS

Peterson. ILM and Tiered Storage, Oct. 2005 http://www.snia.org/forums/dmf/knowledge/DMF-SNS_Tiered_Storage_20051024.pdf. Last accessed Apr. 30, 2008, 3 pages.

Gemulla, et al. A Dip in the Reservoir: Maintaining Sample Synopses of Evolving Datasets. In VLDB '06, Sep. 12-15, 2006, Seoul, Korea. VLDB Endowment, ACM 1-59593-385-9/06/09. http://dblab.sogang.ac.kr/vldb2006/contents/p595-gemulla.pdf. Last accessed Apr. 30, 2008, 12 pages.

Birrell, et al. A Design for High-Performance Flash Disks. Last accessed Apr. 30, 2008, 7 pages.

Jermaine, et al. A Novel Index Supporting High Volume Data Warehouse Insertions. In: Proceedings of the 25th VLDB Conference, Edinburgh, Scotland, 1999. Last accessed Apr. 30, 2008, 12 pages.

Vitter. An Efficient Algorithm for Sequential Random Sampling. In: ACM Transactions on Mathematical Software, vol. 13, No. 1, Mar. 1987, pp. 58-67. Last accessed May 7, 2008, 10 pages.

Wu, et al. An Efficient R-Tree Implementation over Flash-Memory Storage Systems. GIS'03, Nov. 7-8, 2003, New Orleans, Louisiana, USA. ACM 1-58113-730-3/03/0011. Last accessed May 7, 2008, 8 pages.

Ganguly, et al. Bifocal Sampling for Skew-Resistant Join Size Estimation. In: SIGMOD'96, Montreal, Canada. ACM 0-89791-794-4/96/0006. Last accessed May 7, 2008, 11 pages.

Mathur, et al. Capsule: An Energy-Optimized Object Storage System for Memory-Constrained Sensor Devices. In: SenSys'06, Nov. 1-3, 2006, Boulder, Colorado, USA. ACM 1-59593-343-3/06/0011. Last accessed May 7, 2008, 14 pages.

Lee, et al. Design of Flash-Based DBMS: An In-Page Logging Approach. In: SIGMOD'07, Jun. 12-14, 2007, Beijing, China. ACM 978-1-59593-686-8/07/0006. Last accessed May 7, 2008, 12 pages.

Babcock, et al. Dynamic Sample Selection for Approximate Query Processing. Last accessed May 7, 2008, 12 pages.

Gibbons, et al. Estimating Simple Functions on the Union of Data Streams, Nov. 10, 2000. Last accessed May 7, 2008, 13 pages.

Jain, et al. Exploiting Mobility for Energy Efficient Data Collection in Wireless Sensor Networks. Published online: Apr. 28, 2006. Last accessed May 7, 2008, 13 pages.

Nath, et al. FlashDB: Dynamic Self-tuning Database for NAND Flash. In: IPSN'07, Apr. 25-27, 2007, Cambridge, Massachusetts, USA. ACM 978-1-59593-638-7/07/0004. Last accessed May 7, 2008, 10 pages.

Ganti, et al. ICICLES: Self-tuning Samples for Approximate Query Answering. In: Proceedings of the 26th VLDB Conference, Cairo, Egypt, 2000. Last accessed May 7, 2008, 12 pages.

Hellerstein, et al. Informix under CONTROL: Online Query Processing. In: Data Mining and Knowledge Discovery, 12, 281-314, 2000. Last accessed May 7, 2008, 34 pages.

Zeinalipour-Yazti, et al. MicroHash: An Efficient Index Structure for Flash-Based Sensor Devices. Last accessed May 7, 2008, 14 pages.

Hachman. New Samsung Notebook Replaces Hard Drive With Flash, May 23, 2006. Last accessed May 7, 2008, 4 pages.

Jermaine, et al. Online Maintenance of Very Large Random Samples. In: SIGMOD 2004, Jun. 13-18, 2004, Paris, France. ACM 1-58113-859-8/04/06. Last accessed May 7, 2008, 12 pages.

Chaudhuri, et al. Overcoming Limitations of Sampling for Aggregation Queries. Last accessed May 7, 2008, 9 pages.

Olken, et al. Random Sampling from Hash Files. ACM 089791-365-5/90/0005/0375. Last accessed May 7, 2008, 12 pages.

Vitter. Random Sampling with a Reservoir. In: ACM Transactions on Mathematical Software, vol. 11, No. 1, Mar. 1985, p. 37-57. Last accessed May 7, 2008, 21 pages.

Diao, et al. Rethinking Data Management for Storage Centric Sensor Networks. Last accessed May 7, 2008, 11 pages.

Pugh. Skip Lists: A Probabilistic Alternative to Balanced Trees. Last accessed May 7, 2008, 8 pages.

Douglis, et al. Storage Alternatives for Mobile Computers. Last accessed May 7, 2008, 33 pages.

O'Neil, et al. The Log-Structured Merge-Tree (LSM-Tree). Last accessed May 7, 2008, 32 pages.

Understanding the Flash Translation Layer (FTL) Specification, Dec. 1998, AP-684. Last accessed May 7, 2008, 20 pages.

Zeus-IOPS Solid State Drives Surge to 512GB in Standard 3.5" Form Factor; Offer Unprecedented Performance for Enterprise Computing. Published Apr. 18, 2007. http://www.primenewswire.com/newsroom/news.html?d=117. Last accessed May 7, 2008, 3 pages.

Babcock, et al.; "Models and Issues in Data Streams Systems"; Proceedings of the Twenty-First ACM SIGMOD-SIGACT-SIGART Symposium on Principles of Database Systems; 2002; pp. 1-16.

Babcock, et al.; "Sampling From a Moving Window Over Streaming Data"; Proceedings of the Thirteenth Annual ACM-SIAM Symposium on Discrete Algorithms; 2002; pp. 633-634.

Bash, B.A. et al.; "Approximately Uniform Random Sampling in Sensor Networks"; Proceedings of the First Workshop on Data Management for Sensor Networks; Toronto, Canada; Aug. 30, 2004; 8 pages.

Efraimidis, et al.; "Weighted random sampling with a reservoir"; Information Processing Letters 97; 2006; pp. 181-185.

Jermaine, C.; "Online Random Shuffling of Large Database Tables"; IEEE Transactions on Knowledge and Data Engineering; vol. 19, No. 1; Jan. 2007; pp. 73-84.

Kim, G.J. et al.; "LGeDBMS: a Small DBMS for Embedded System with Flash Memory"; VLDB; 2006; Sep. 12-15, 2006; Seoul, Korea; 4 pages.

Manku, G.S. et al.; "Random Sampling Techniques for Space Efficient Online Computation of Order Statistics of Large Datasets"; Proceedings of the 1999 ACM SIGMOD International Conference on Management of Data; Rec. 28, 2; Jun. 1999; pp. 251-262.

Miller, P; "SimpleTech announces 512GB and 256GB 3.5-inch SSD drives"; Apr. 18, 2007; 3 pages.

Nath, S. et al.; "Online Maintenance of Very Large Random Samples on Flash Storage"; Proceedings of the VLDB Endowment; vol. 1, No. 1; Aug. 2008; pp. 970-983.

Paulson, L.; "Will Hard Drives Finally Stop Shrinking?"; Computer; Technology News; May 2005; pp. 14-16.

Vitter, J.S.; "An Efficient Algorithm for Sequential Random Sampling"; ACM Transactions on Mathematical Software; vol. 13, No. 1; Mar. 1987; pp. 58-67.

Vitter, J.S.; "Faster Methods for Random Sampling"; Communications of the ACM; vol. 27, No. 7; Jul. 1984; pp. 703-718.

N. Agrawal, V. Prabhakaran, T. Wobber, J.D. Davis, M. Manasse, and R. Panigrahy; "Design Tradeoffs for SSD Performance"; in Usenix Annual Technical Conference, 2008, 14 pp.

H. Kim and S. Ahn; "BPLRU: a Buffer Management Scheme for Improving Random Writes in Flash Storage"; in Usenix FAST, 2008, 14 pp.

J. Lee, S. Kim, H. Kwon, C. Hyun, S. Ahn, J. Choi, D. Lee, and S.H. Noh; "Block Recycling Schemes and Their Cost-Based Optimization in NAND Flash Memory Based Storage System"; in ACM/IEEE EMSOFT, 2007. 9 pp.

(56) References Cited

OTHER PUBLICATIONS

D. Reinsel and J. Janukowicz; "Datacenter SSDs: Solid Footing for Growth"; Samsung White Paper, Jan. 2008 [Online at URL <www.samsung.com/.global/business/semiconductor/products/flash/ssd/pdf/datacenter_ssds.pdf>], 7 pp.
SYCARD; "CF Extend 180 CompactFlash Flexible Extender Card"; 2008 [Online at URL <http://www.sycard.com/cfext180.html>], 2 pp.
J.S. Vitter; "External Memory Algorithms and Data Structures"; in ACM Comput. Surveys, 33(2), Jun. 2001, pp. 209-271.
Office Action Dated Mar. 2, 2011 for U.S. Appl. No. 12/184,213, filed Jul. 31, 2008, by Inventor Suman Kumar Nath, 20 pages.
Response Filed Jun. 3, 2011 to the Office Action Dated Mar. 2, 2011 for U.S. Appl. No. 12/184,213, filed Jul. 31, 2008, by Inventor Suman Kumar Nath, 15 pages.
Office Action Dated Aug. 2, 2011 for U.S. Appl. No. 12/184,213, filed Jul. 31, 2008, by Inventor Suman Kumar Nath, 23 pages.
Response Filed Oct. 6, 2011 to the Office Action Dated Aug. 2, 2011 for U.S. Appl. No. 12/184,213, filed Jul. 31, 2008, by Inventor Suman Kumar Nath, 11 pages.
Office Action Dated Oct. 27, 2011 for U.S. Appl. No. 12/184,213, filed Jul. 31, 2008, by Inventor Suman Kumar Nath, 22 pages.
Response Filed Jan. 17, 2012 to the Office Action Dated Oct. 27, 2011 for U.S. Appl. No. 12/184,213, filed Jul. 31, 2008, by Inventor Suman Kumar Nath, 10 pages.
Office Office Action Dated Mar. 5, 2012 for U.S. Appl. No. 12/184,213, filed Jul. 31, 2008, by Inventor Suman Kumar Nath, 19 pp.
Response Filed Jul. 2, 2012 to the Office Action Dated Mar. 5, 2012 for U.S. Appl. No. 12/184,213, filed Jul. 31, 2008, by Inventor Suman Kumar Nath, 15 pages.

* cited by examiner

300

400

B-FILE ABSTRACTION FOR EFFICIENTLY ARCHIVING SELF-EXPIRING DATA

BACKGROUND

Recent technological trends in flash media have made it an attractive alternative for data storage in a wide spectrum of computing devices such as PDA's, mobile phones, embedded sensors, MP3 players, etc. The success of flash media for these devices is due mainly to its superior characteristics such as smaller size, lighter weight, better shock resistance, lower power consumption, less noise, and faster read performance than disk drives. While flash-memory has been the primary storage media for embedded devices from the very beginning, there is an increasing trend that flash memory will infiltrate the personal computer market segment. As its capacity increases and price drops, flash media can overcome adoption as compared with lower-end, lower-capacity magnetic disk drives.

Current practices allow for running a full database system on flash-only computing platforms and running a lightweight database system on flash-based embedded computing devices. However, flash has fundamentally different read/write characteristics from other non-volatile media such as magnetic disks. In particular, flash writes are immutable and once written, a data page must be erased before it can be written again. Moreover, the unit of erase often spans multiple pages, further complicating storage management. With current practices, these unique characteristics can be hidden from applications via a software layer called the Flash Translation Layer (FTL), which enables mounting and using a flash media like a disk drive. Using the FTL, conventional disk-based database algorithms and access methods will function correctly without any modification.

However, since the FTL needs to internally deal with flash characteristics, many algorithms designed for magnetic disks are not likely to yield the best attainable performance. For example, algorithms that overwrite data in place may work well with magnetic disks, but will perform poorly with flash media. Thus, in order to make a flash-based storage systems efficient, many algorithms need to be redesigned to take flash characteristics into account.

As a specific example, consider maintenance of a very large (e.g., several gigabytes) random sampling of an evolving data stream. In this context, random sampling is a approximation technique used in many applications including data mining, statistics, and machine learning. In many scenarios, the sample needs to be very large to be effective. For example, when the underlying data has a high variance, a very large sample is required to provide accurate estimates with suitably high confidence. Moreover, variance in the data is often magnified by standard database operators like selections and joins, increasing the size of the sample required to ensure a target approximation accuracy. Another example is sensor networks, where each sensor collects too many readings to store all of them in its limited storage, and transmitting all its readings to a base station expends too much of its limited battery. In such a case, it is desirable for the sensor to maintain a random sample of its readings. Operatively, queries can be pushed to the sensor nodes, and answered using the sample points falling within a specified time window. Humans or data mules traveling next to a sensor node can be used to retrieve its sample for offline data mining or statistical analysis purposes; while such mules minimize the energy cost of retrieving data, they typically pass by a sensor node far too infrequently to collect more than a sample of its readings. It is desirable that the sample maintained on the sensor node is large (in many cases, as large as possible) because (i) scientists deploying the sensors usually want to collect as much data as possible, and (ii) a very large sample helps ensure that there will be a sufficient number of sample points within every time-window of interest.

However, currently deployed sampling algorithms are lacking since they do not offer one or more of the following properties, the algorithm is suitable for streaming data, or any similar environment where a large sample must be maintained online in a single pass through the dataset; the algorithm must be efficient, in terms of latency or energy, on flash; i.e., it should be flash-aware and it should avoid operations (e.g., in-place updates) that are expensive on flash; and the algorithm should be tunable to both the amount of flash storage and the amount of standard memory (DRAM) available to the algorithm. Thus, the algorithm can be tunable to a specified bounded sample size, and DRAM-constrained embedded devices can use the algorithm, while less constrained devices can take advantage of the larger available DRAM.

For example, reservoir-sampling and geometric file are two algorithms for maintaining a bounded size sample. Both can be implemented to maintain a sample on flash media, but both require many in-place updates on flash and, hence, are very slow and energy expensive in flash. Moreover, geometric file has a large DRAM footprint, and hence is not suitable for most embedded systems.

It is appreciated that although current practices for the storage and management of data on flash media have been described to be lacking in the context of data sampling operations that such description is not inclusive of other operational deficiencies experienced when performing current practices. For example, such deficiency exist for other data management algorithms that require "expiring" old data. In such scenario, in an archival system, one may decide to expire old data in case available storage space does not allow for archiving all of the data. It is further appreciated that such deficiencies resulting from existing practices can be alleviated by systems and methods providing a B-File which allows for the efficient storage of "self-expiring" data on flash media and that can be deployed by various data storage and management algorithms including but not limited to sampling algorithms, archiving algorithms, etc.

From the foregoing it is appreciated that there exists a need for systems and methods to ameliorate the shortcomings of existing practices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject matter described herein allows for systems and methods to for data processing and storage management. In an illustrative implementation an exemplary computing environment comprises at least one data store operative to store one or more data elements, a data processing and storage management engine (B-File engine), and at least one instruction set to instruct the B-File engine to process and/or store data according to a selected data processing and storage management paradigm. In the illustrative implementation, the data processing and storage management paradigm allows for the storage of data according to data buckets.

In an illustrative operation, the exemplary B-File engine can generate a B-File that can comprise multiple buckets and store items in a random bucket according to a selected distribution that can be dependent on the desired algorithm's properties and various overhead trade-offs. In the illustrative operation, the B-File can be deployed by a data sampling algorithm where items can be assigned to buckets depending on properties including but not limited to whether the items are sampled uniformly, randomly, or according to the items' weights.

In the illustrative operation, when the size of the B-File grows to reach a selected threshold (e.g., maximum available space), the B-File engine can operatively shrink the B-File by discarding one of the buckets, for example, the largest bucket. In the illustrative operation, the B-File engine can perform one or more operations in managing the B-File comprising appending data to existing buckets and explicit clustering of data when erasing data such that data can be deleted together into the same flash block to optimize flash media data erasure.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION

Figure 1:
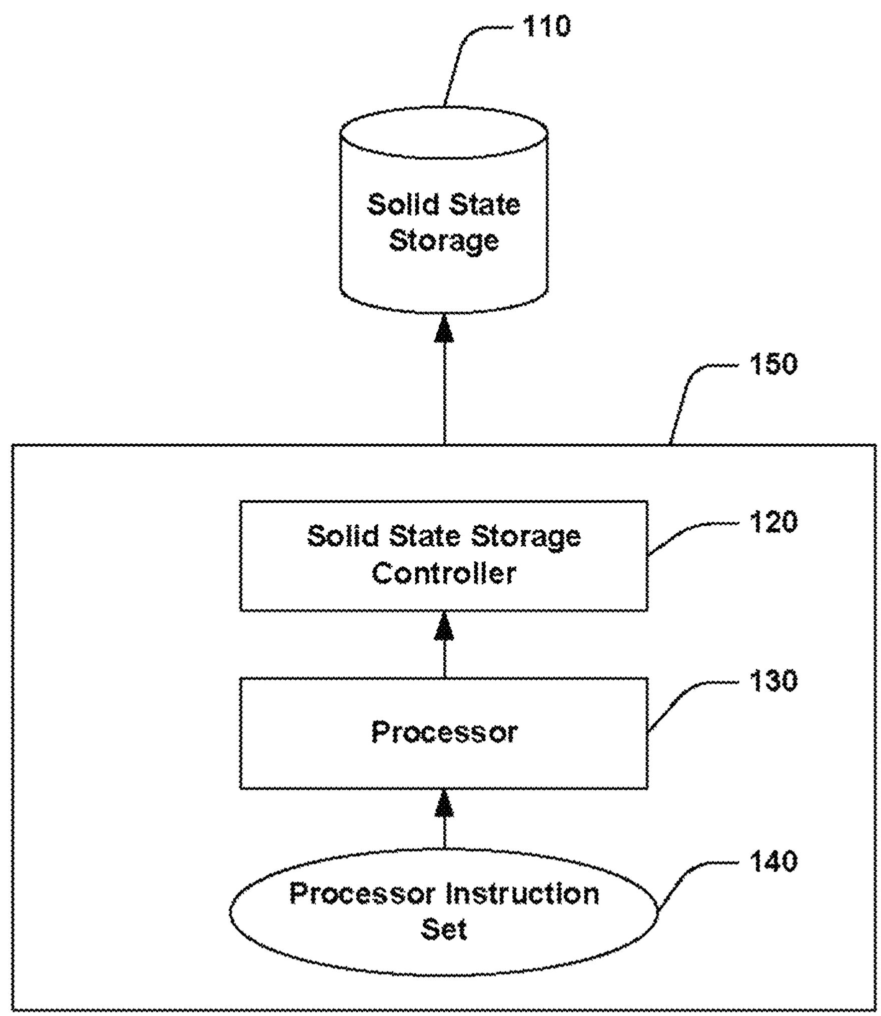
FIG. 1 is a block diagram of one example of an exemplary computing environment in accordance with the herein described systems and methods.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative illustrations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

B-File Extraction Overview:

The herein described systems and methods ameliorate the shortcomings of existing practices by providing for and utilizing a B-File (bucket file) to maintain a large sample of data in flash media. Is it appreciated that although the B-File is described in context of maintaining a data sample, that such description is merely illustrative since the herein described systems and methods allow for the use of B-File by other data management and/or storage processes including those where data expires and needs to be discarded after some time.

In an illustrative implementation, a B-File can comprise multiple buckets such that, operatively, one or more data items that are included in a data sample are stored in a random bucket according to a selected data distribution. Illustratively, the exemplary selected data distribution can be dependent, preferably in a non-trivial manner, on various characteristics of the data environment including but not limited to desired sample properties (e.g., uniform, biased, etc.) and various overhead trade-offs. In an illustrative operation, when the size of the B-File grows to reach a selected threshold (e.g., maximum available space), the herein described systems and methods prescribe shrinking the data set by illustratively discarding the largest bucket.

The B-File deployment provides for various efficiencies over existing practices that can be attributed to various B-File properties including but not limited to data is appended to existing buckets, instead of overwriting any existing data on flash; and the B-File when deployed explicitly clusters data to be deleted into the same flash block so that data can be efficiently erased.

It is appreciated that a B-FILE is a general abstraction and can be used for many purposes other than sampling. For example, it can be used to archive data and to automatically age it, based on arrival time or priority of the data, to and reclaim storage space for newly-arriving data. In this context of sensor networks where sensors have limited storage and are deployed in remote areas for long periods without human intervention a B-File deployment can provide efficiencies.

In am illustrative implementation, a B-FILE can comprise a set of application buckets $\cup_i B_i$ stored illustratively on a flash media. Physically, however, a B-FILE can operatively store these buckets, in the illustrative implementation, as a collection of N "individual" buckets holding the first N application buckets and one "tail" bucket holding the remaining buckets. As a matter of nomenclature, the N application buckets can be referred to as "application buckets" and the tail bucket can be referred to as "B-File" buckets.

Data Processing and Management Using B-Files:

FIG. 1 describes an exemplary computing environment 100 operable to control and manage data storage on solid state storage (e.g., flash media). As is shown, in an illustrative implementation, exemplary computing environment 100 comprises computer environment 150 and solid state storage device 110. Further, as is shown, computer environment 150 comprises solid storage device controller 120, processor 130, and processor instruction set 140.

In an illustrative operation, computing environment 100 can process data for storage and management on solid state storage device 110. In the illustrative operation, processor 130 of computer environment 150 can process data for storage and management on solid state storage device 110 by executing one or more instructions from processor instruction set 140 allowing for the storage and/or management data on solid state storage device 110 through solid state storage controller 120. Operatively, solid state storage controller 120 directed by processor 130 can store and/or manage data on solid state storage device 110 according to one or more data storage principles applicable to the storage and/or management of data on solid state storage devices.

In an illustrative implementation, exemplary data storage principles include but are not limited to deleting items in batch and cluster items to delete together in as few blocks as possible. Stated differently, deleting data in a solid state storage devices (e.g., flash media) generally requires a block erase operation. That is, before erasing a block, valid data in the block needs to be copied to some other location, which requires reading and writing all the valid data. The amortized cost of deleting an item can be made orders of magnitude smaller by deleting multiple items with a single erase operation. This can be done by clustering data that will be deleted together in the same block.

A second exemplary principle considers updating data already written to flash media. Stated differently, flash media does not allow updating data in place. Another exemplary principle considers allocating and de-allocating storage space in granularity of blocks. Possible choices for an allocation/de-allocation size can include: (i) sub-page granularity, where fractions of a single flash page are allocated independently (i.e., the same flash page can contain multiple independent data units), (ii) page granularity, where each entire page is allocated independently, and (iii) block granularity, where each entire flash block is allocated independently.

Another solid state storage operating principle considers avoiding random writes in flash media. Generally, flash media is an electronic device and thus has no mechanically moving parts like disk heads in a magnetic disk drive. Therefore, a raw flash memory chip can provide similar sequential and random access speed. However, flash media generally provide poor random write performance.

It is appreciated that although solid state storage device 110 is shown to be independent of computer environment 150 that such description is merely illustrative as the inventive concepts described herein also are applicable to a computing environment 100 which includes a solid state storage device/component within a computer environment as well.

Figure 2:
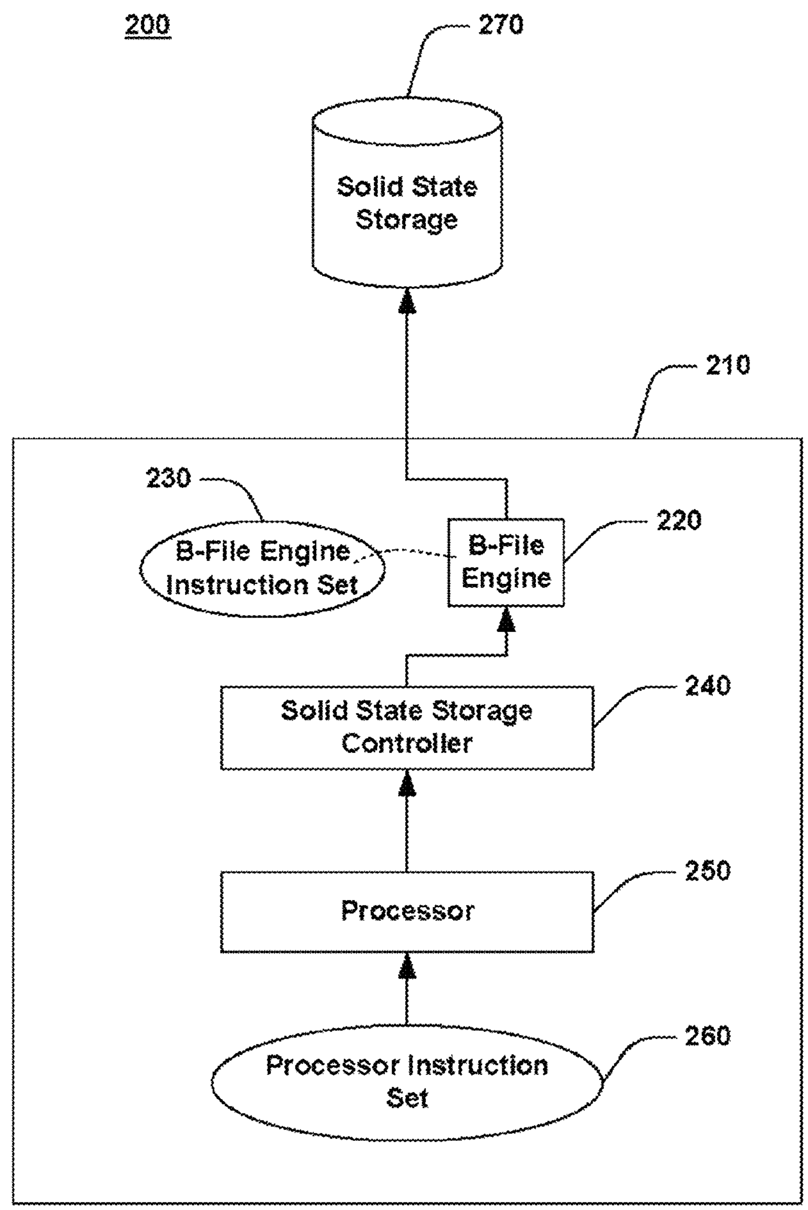
FIG. 2 is a block diagram of one example of an exemplary computing environment deploying B-File memory management in accordance with the herein described systems and methods.

FIG. 2 describes exemplary computing environment 200 operable to control and manage data storage on solid state storage (e.g., flash media). As is shown in FIG. 2, in an illustrative implementation, exemplary computing environment comprises computer environment 210 and solid state storage device 270. Further, as is shown, computer environment 210 comprises processor 250, processor instruction set 260, solid state storage controller 240, B-File engine 220, and B-File engine instruction set 230. In the illustrative implementation, processor 250, solid state storage controller 240, B-File engine 220, and solid state storage device 270 are electronically coupled allowing for the communication of various data and/or instructions for storage and/or execution.

In an illustrative operation, computing environment 200 can process data for storage and management on solid state storage device 270. In the illustrative operation, processor 250 of computer environment 210 can process data for storage and management on solid state storage device 270 by executing one or more instructions from processor instruction set 260 allowing for the storage and/or management data on solid state storage device 270 through solid state storage controller 240, B-File engine 220 operating according to one or more instructions provided by B-File engine instructions et 230. Operatively, solid state storage controller 240 directed by processor 250 can store and/or manage data on solid state storage device 170 according to one or more data storage principles applicable to the storage and/or management of data on solid state storage devices as illustratively provided by B-File engine 220 operating according to one or more instructions provided by B-File engine instruction set 230.

In the illustrative operation, the B-File engine 220 processes one or more instructions from B-File engine instruction set 230 to store data according to selected solid state media (e.g., flash media) data storage and management paradigm utilizing illustrative B-Files. In the illustrative implementation, a B-File can comprise a large set of application buckets $\cup_i B_i$ stored on a flash media. Physically, the B-File can illustratively store these buckets in a collection of N "individual" buckets holding the first N application buckets and one "tail" bucket holding all the remaining (typically very small) buckets.

At a high level, the B-File can operatively support the following exemplary operators: new B-File(N): Create a new B-File with N individual B-File buckets plus one tail B-File bucket; AddItem(v,i): Add item v to application bucket $B_i$; size and size(i): Return the number of items in the entire B-File or in application bucket $B_i$; and DiscardBucket(i): Discard the items in application bucket $B_i$, and reclaim the space.

Illustratively, when used in context to a sampling algorithm, the sizes of individual application buckets can operatively exponentially decrease, with the first bucket $B_1$ being the largest. At any point of time, the contents of the buckets can represent the random sample S over the entire data stream S'.

Figure 3:
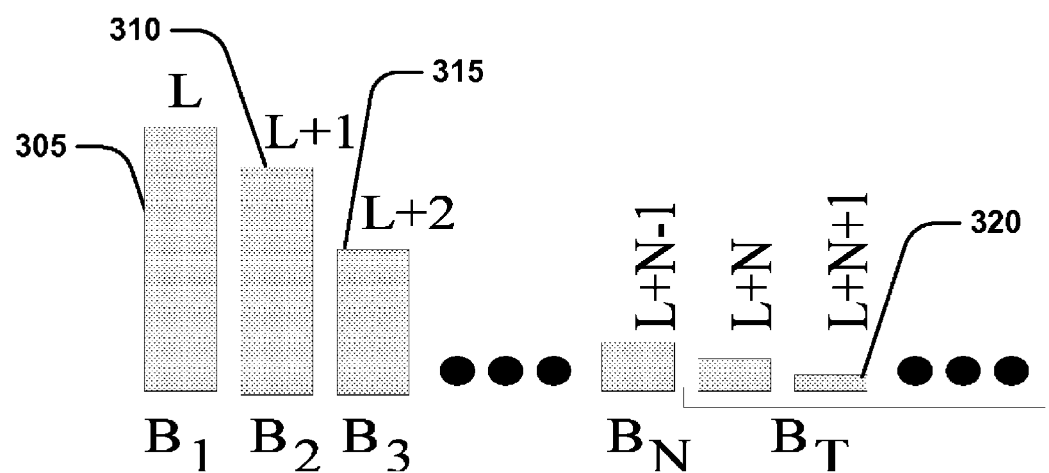
FIG. 3 is a block diagram of an exemplary B-File in accordance with the herein described systems and methods.

FIG. 3 depicts an exemplary snapshot of exemplary B-File 300. As is shown in FIG. 3, solid bars 305, 310, 315, up to and including 320, can illustratively represent application buckets. In an illustrative implementation, text above a bar can represent the level of the items in the buckets 305, 310, 315, up to and including 320, and text below a bucket can illustratively represent the B-File bucket number. In the illustrative implementation, the tail B-File bucket BT can illustratively contain items with a selected threshold level (e.g., level L+N).

Figure 4:
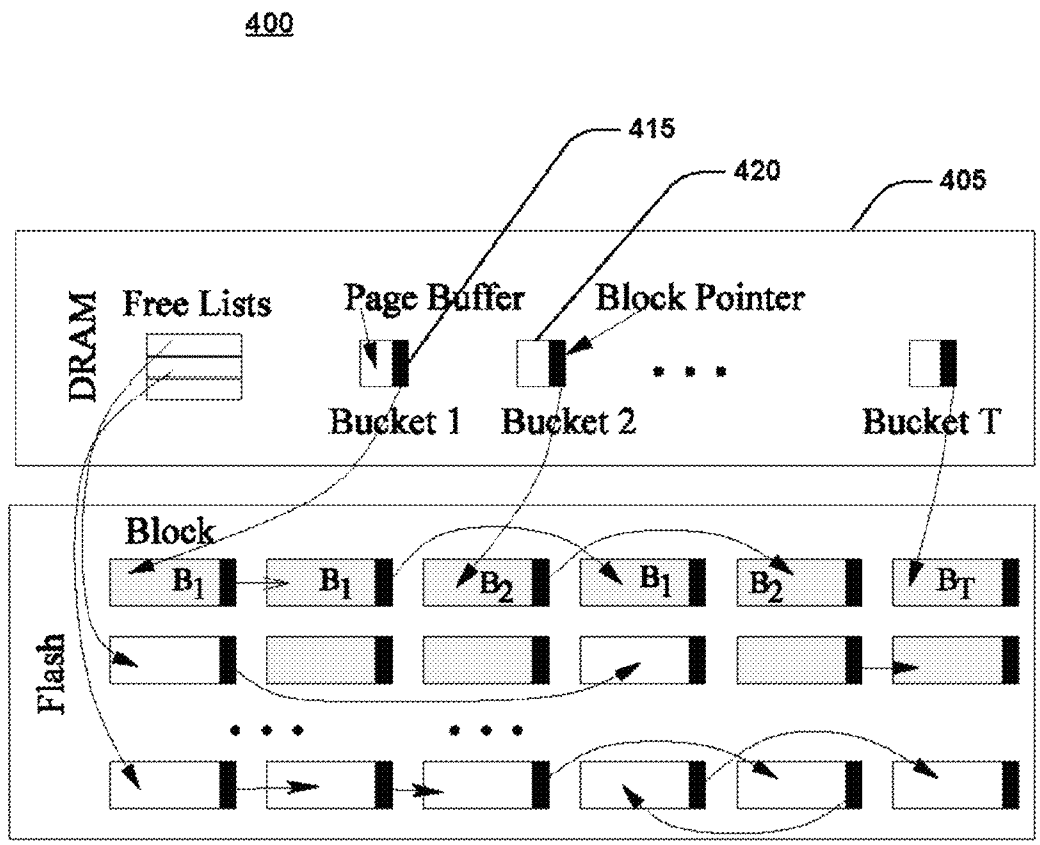
FIG. 4 is a block diagram of the schematic of a decision tree representative of B-File memory management in accordance with the herein described systems and methods.

FIG. 4 depicts an exemplary physical layout of exemplary B-File buckets (e.g., 305, 310, 315, up to and including 320 of FIG. 3). As is shown in FIG. 4, section 405 illustratively describes an in-memory portion of the B-File bucket. In an illustrative implementation, for a B-File bucket $B_i$ (including the tail bucket), an in-memory data structure called $B_i$ header can be maintained in the in-memory portion 405. The header can illustratively comprise a page buffer 415 that can temporarily hold one flash page worth of data, and a block pointer 420 that can exemplary point to the first flash block containing the items in that block.

In an illustrative operation, when an item is added to a bucket, it is temporarily put in its page buffer 415. When the page buffer 415 holds one page worth of data, the buffer is flushed to the next available page within the block pointed to by the block pointer. Search or retrieval of items in a bucket starts with the block pointer. In the illustrative implementation, an exemplary B-File engine (e.g., 220 of FIG. 2) can illustratively write in-memory 405 buffers to flash pages. When the buffer holds one page worth of data, the buffer can be flushed to the next available page within the block h pointed by the block pointer. When no empty page is available in that block h, a new block h' is allocated by the exemplary B-File engine.

A pointer 420 to the block h can be stored at the end of block h' and the block pointer is updated to h'. In the illustrative implementation, the blocks in a bucket can be chained together with backward pointers and the address of the last block is maintained in the block pointer. Further, in the illustrative implementation, an exemplary B-File engine can keep track of available blocks and allocate them on demand. When the B-File engine discards a bucket, the block pointer of the bucket can be returned.

In the illustrative implementation, the size of exemplary B-File 400 can fluctuate between two user-specified bounds $s_{min}$ and $s_{max}$. In the illustrative implementation, there can exist a non-trivial interaction between the cost of maintaining samples in a B-File, and the difference $\delta=s_{max}-s_{min}$. Illustratively, a large value of $\delta$ is not desirable, since buckets are discarded less frequently and more items are added to the B-File (some of which are discarded later). Illustratively, a small value of $\delta$ is not desirable either, because then the tail bucket can contain a large number of items, increasing the cost of log unroll.

Figure 5:
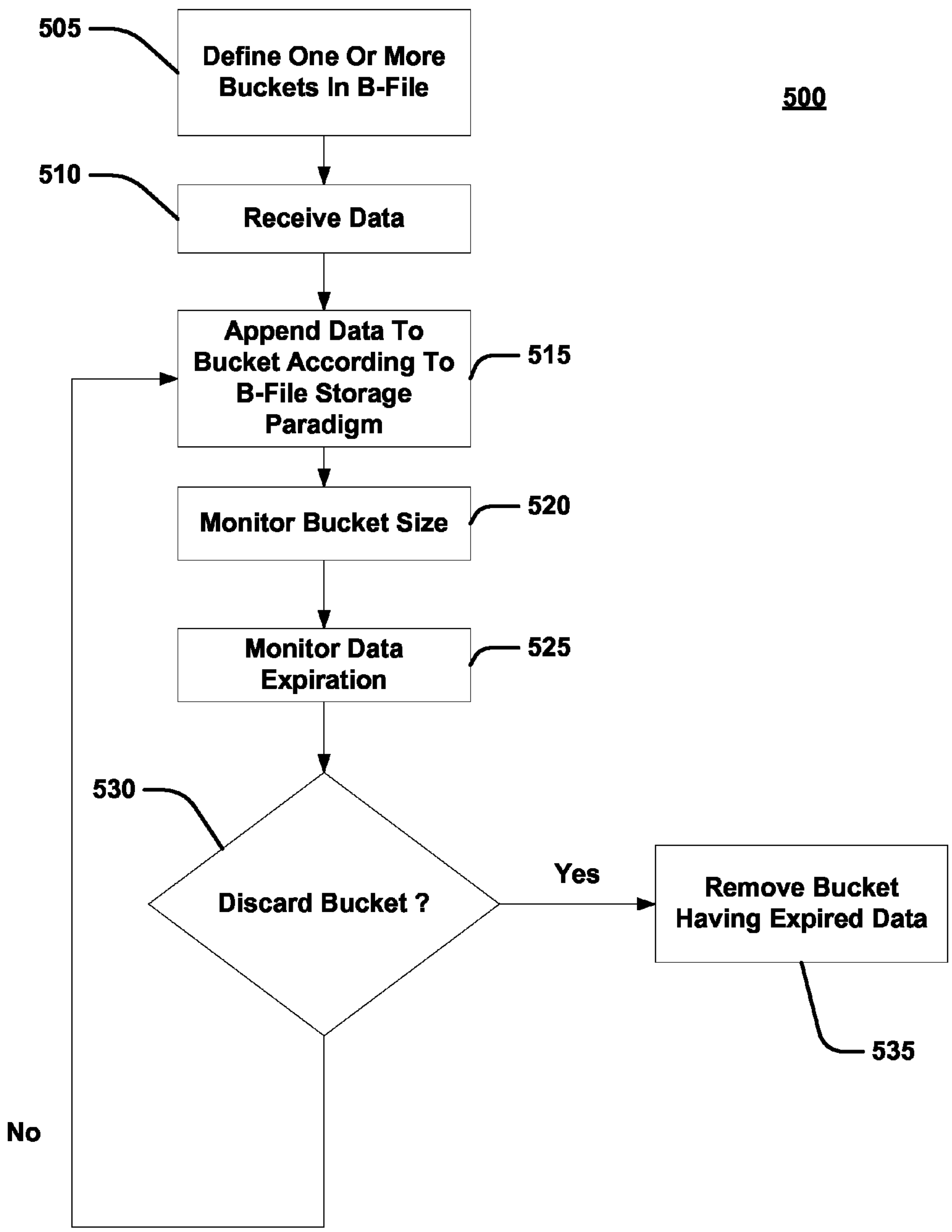
FIG. 5 is a flow diagram of an exemplary method performed for memory management using B-File abstraction in accordance with the herein described systems and methods.

FIG. 5 is a flow diagram of an exemplary method 500 for managing and/or storing data using a B-File. As is shown, processing begins at block 505 where one or more buckets in the B-File are defined. Processing then proceeds to block 510 where sample data is received. The received data is then processed and appended to a selected bucket according to a B-File storage paradigm at block 515. From there, processing proceeds to block 520 where the bucket size is monitored. The data expiration is also monitored at block 525. A check is then performed at block 530 to determine whether the monitored bucket should be discarded.

If the check at block 530 determines that the monitored bucket is to be discarded (e.g., the data in the bucket is to be deleted), processing proceeds to block 535 where the bucket having the expiring data is removed. However, if the check at block 530 indicates that the monitored bucket is not to be discarded, processing reverts back to block 515.

Figure 6:
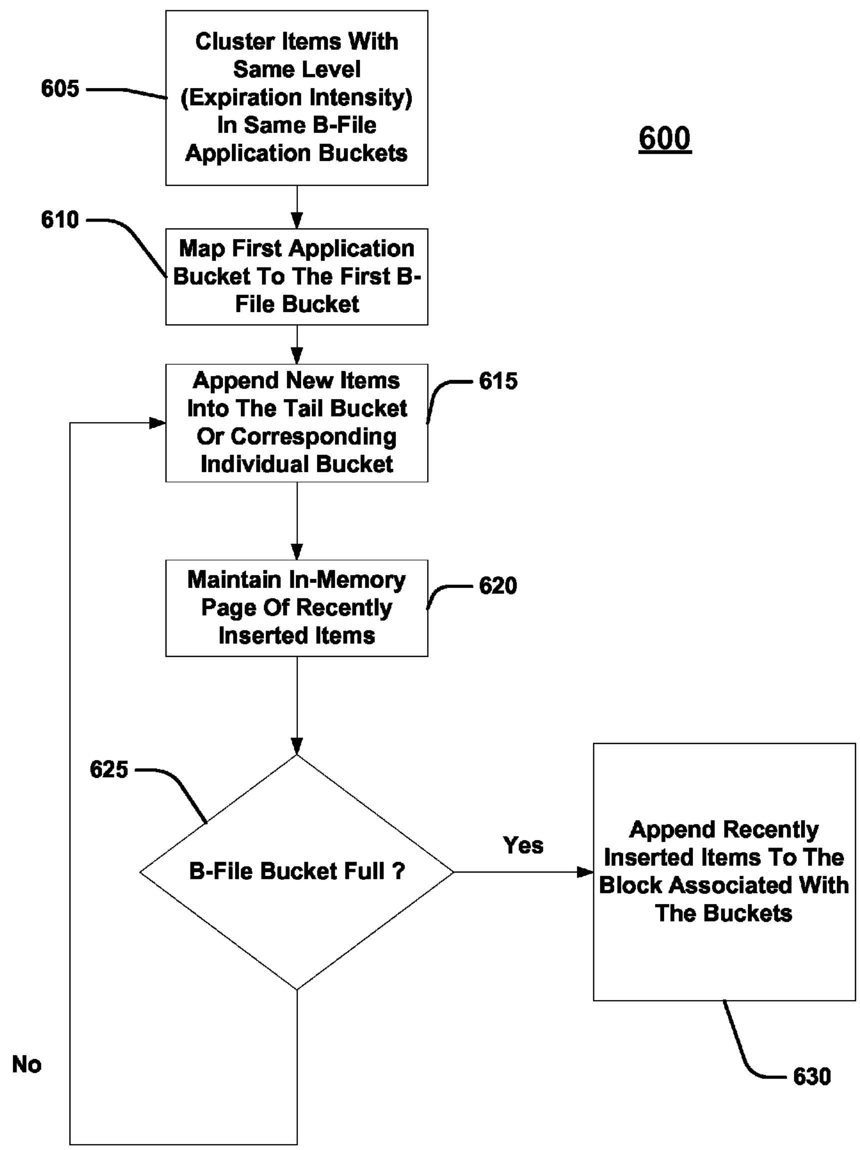
FIG. 6 is a flow diagram of another exemplary method performed for B-File abstraction in accordance with the herein described systems and methods.

FIG. 6 is a flow diagram of an exemplary method 600 to append data in a B-File. Processing begins at block 605 where items having the same level (e.g., expiration intensity) are clustered in the same B-File application buckets. From there processing proceeds to block 610 where the first application bucket is mapped to the first B-File bucket. New items are then appended into the tail bucket or the corresponding individual bucket at block 615. From there, processing proceeds to block 620 where an in-memory page of recently inserted items is inserted into the selected B-File bucket. A check is performed at block 625 to determine if the B-File bucket to which items are being amended is full. If the check at block 625 determines that the B-File bucket is full, processing proceeds to block 630 where the recently inserted items are inserted to the block associated with the buckets. However, if the check at block 625 indicates that the B-File bucket is not full, processing reverts to block 615 and proceeds from there.

The methods can be implemented by computer-executable instructions stored on one or more computer-readable media or conveyed by a signal of any suitable type. The methods can be implemented at least in part manually. The steps of the methods can be implemented by software or combinations of software and hardware and in any of the ways described above. The computer-executable instructions can be the same process executing on a single or a plurality of microprocessors or multiple processes executing on a single or a plurality of microprocessors. The methods can be repeated any number of times as needed and the steps of the methods can be performed in any suitable order.

The subject matter described herein can operate in the general context of computer-executable instructions, such as program modules, executed by one or more components. Generally, program modules include routines, programs, objects, data structures, etc., that perform particular tasks or implement particular abstract data types. Typically, the functionality of the program modules can be combined or distributed as desired. Although the description above relates generally to computer-executable instructions of a computer program that runs on a computer and/or computers, the user interfaces, methods and systems also can be implemented in combination with other program modules. Generally, program modules include routines, programs, components, data structures, etc. that perform particular tasks and/or implement particular abstract data types.

Moreover, the subject matter described herein can be practiced with most any suitable computer system configurations, including single-processor or multiprocessor computer systems, mini-computing devices, mainframe computers, personal computers, stand-alone computers, hand-held computing devices, wearable computing devices, microprocessor-based or programmable consumer electronics, and the like as well as distributed computing environments in which tasks are performed by remote processing devices that are linked through a communications network. In a distributed computing environment, program modules can be located in both local and remote memory storage devices. The methods and systems described herein can be embodied on a computer-readable medium having computer-executable instructions as well as signals (e.g., electronic signals) manufactured to transmit such information, for instance, on a network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing some of the claims.

It is, of course, not possible to describe every conceivable combination of components or methodologies that fall within the claimed subject matter, and many further combinations and permutations of the subject matter are possible. While a particular feature may have been disclosed with respect to only one of several implementations, such feature can be combined with one or more other features of the other implementations of the subject matter as may be desired and advantageous for any given or particular application.

Moreover, it is to be appreciated that various aspects as described herein can be implemented on portable computing devices (e.g., field medical device), and other aspects can be implemented across distributed computing platforms (e.g., remote medicine, or research applications). Likewise, various aspects as described herein can be implemented as a set of services (e.g., modeling, predicting, analytics, etc.).

Figure 7:
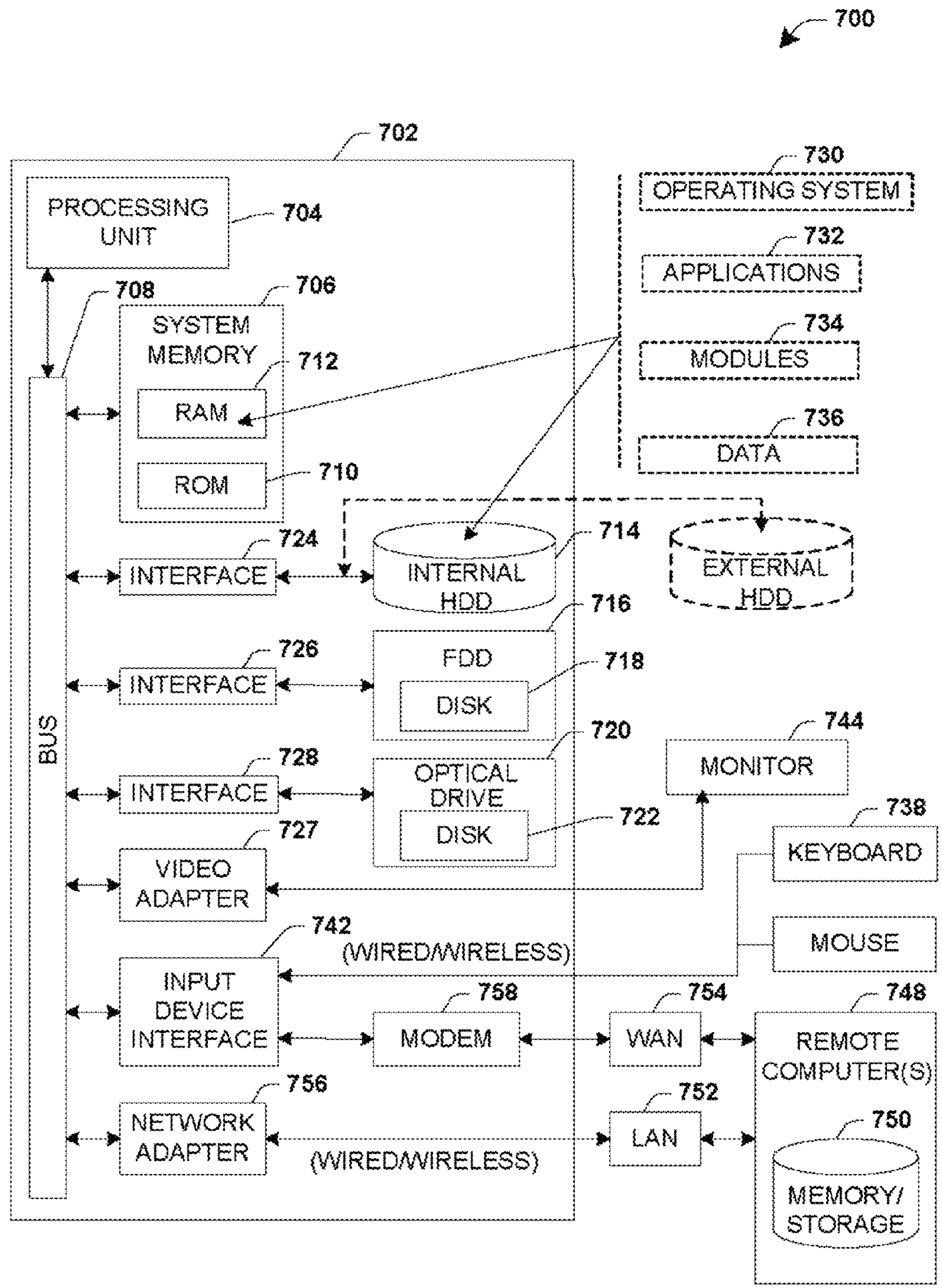
FIG. 7 is a block diagram of an exemplary computing environment.

FIG. 7 illustrates a block diagram of a computer operable to execute the disclosed architecture. In order to provide additional context for various aspects of the subject specification, FIG. 7 and the following discussion are intended to provide a brief, general description of a suitable computing environment 700 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

More particularly, and referring to FIG. 7, an example environment 700 for implementing various aspects as described in the specification includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a non-volatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the specification can be implemented with various commercially available operating systems or combinations of operating systems.

A user can enter commands and information into the computer 702 through one or more wired/wireless input devices, e.g., a keyboard 738 and a pointing device, such as a mouse.

Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 727. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are example and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
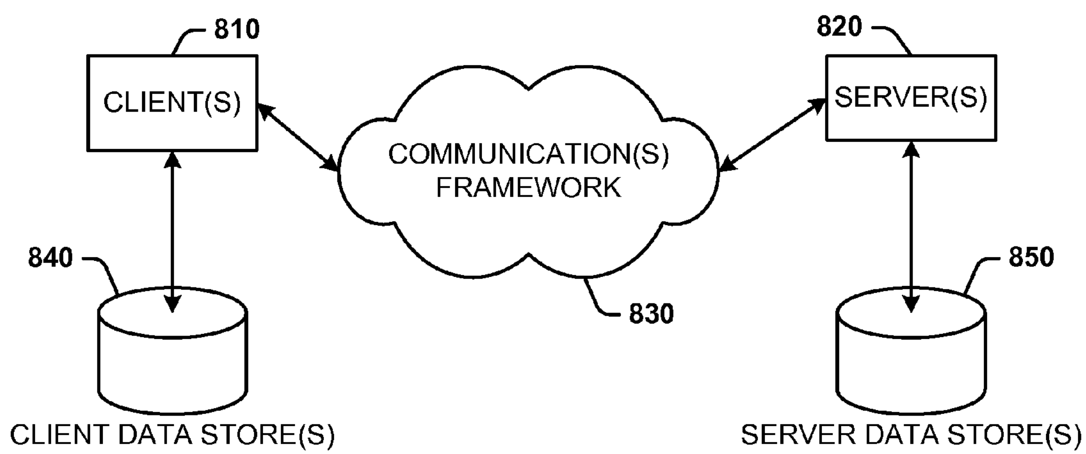
FIG. 8 is a block diagram of an exemplary networked computing environment.

Referring now to FIG. 8, there is illustrated a schematic block diagram of an exemplary computing environment 800 in accordance with the subject invention. The system 800 includes one or more client(s) 810. The client(s) 810 can be hardware and/or software (e.g., threads, processes, computing devices). The client(s) 810 can house cookie(s) and/or associated contextual information by employing the subject invention, for example. The system 800 also includes one or more server(s) 820. The server(s) 820 can also be hardware and/or software (e.g., threads, processes, computing devices). The servers 820 can house threads to perform transformations by employing the subject methods and/or systems for example. One possible communication between a client 810 and a server 820 can be in the form of a data packet adapted to be transmitted between two or more computer processes. The data packet may include a cookie and/or associated contextual information, for example. The system 800 includes a communication framework 830 (e.g., a global communication network such as the Internet) that can be employed to facilitate communications between the client(s) 810 and the server(s) 820.

Communications can be facilitated via a wired (including optical fiber) and/or wireless technology. The client(s) 810 are operatively connected to one or more client data store(s) 840 that can be employed to store information local to the client(s) 810 (e.g., cookie(s) and/or associated contextual information). Similarly, the server(s) 820 are operatively connected to one or more server data store(s) 850 that can be employed to store information local to the servers 820.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:

receiving data items for storage on a solid state storage device having multiple storage blocks;

determining different levels for the data items, wherein the different levels determine when the data items expire and are deleted from the solid state storage device;

assigning the data items to different storage buckets of a bucket file based on the levels;

appending the data items within the different storage buckets on the solid state storage device such that individual storage buckets of data items are clustered together in corresponding blocks of the solid state storage device while maintaining corresponding numbers of the data items in the different storage buckets so that the corresponding numbers of the data items in the different storage buckets progressively decrease by level; and periodically deleting largest storage buckets from the solid state storage device via one or more block erase operations while at least some other storage buckets remain stored on the solid state storage device, the largest storage buckets having greater numbers of the data items than the other storage buckets that remain stored on the solid state storage device.

2. The method of claim 1, further comprising:

periodically making determinations that the bucket file has reached a size threshold; and performing the periodically deleting responsive to the determinations.

3. The method of claim 1, wherein the corresponding numbers of the data items of the different storage buckets are exponentially decreasing.

4. The method of claim 1, wherein the at least some other storage buckets that remain stored on the solid state storage device comprise a random sample from an evolving data stream, and the largest storage buckets are periodically removed from the random sample via the one or more block erase operations.

5. The method of claim 1, further comprising:

maintaining, in a memory device, in-memory portions of individual storage buckets; and appending the data items within the individual storage buckets by writing the data items from the in-memory portions to the solid state storage device.

6. The method of claim 1, wherein the in-memory portions comprise page buffers that temporarily store pages of data items.

7. The method of claim 6, wherein the appending comprises flushing an individual page of data items responsive to determining that the individual page holds one page worth of data.

8. A system comprising:

a solid state storage device having multiple storage blocks;

a hardware processing unit; and a memory device storing computer-readable instructions that cause the hardware processing unit to:

receive data items for storage on the solid state storage device;

determine different levels for the data items, wherein the different levels determine when the data items expire and are deleted from the solid state storage device;

assign the data items to different storage buckets of a bucket file based on the levels;

append the data items within the different storage buckets on the solid state storage device such that individual storage buckets of data items are clustered together in corresponding blocks of the solid state storage device;

maintain corresponding numbers of the data items in the different storage buckets so that the corresponding numbers of the data items in the different storage buckets progressively decrease by level; and periodically delete largest storage buckets from the solid state storage device via one or more block erase operations while at least some other storage buckets remain stored on the solid state storage device, the largest storage buckets having greater numbers of the data items than the other storage buckets that remain stored on the solid state storage device.

9. The system of claim 8, wherein the computer-readable instructions cause the hardware processing unit to:

make periodic determinations that a size of the bucket file has reached a threshold; and periodically delete the largest storage buckets responsive to the periodic determinations.

10. The system of claim 8, wherein the computer-readable instructions cause the hardware processing unit to:

determine the different storage buckets for the data items randomly.

11. The system of claim 8, wherein the solid state storage device is a flash storage device.

12. The system of claim 8, wherein the computer-readable instructions cause the hardware processing unit to:

append first data items in a first storage bucket of the different storage buckets without overwriting any other first data items already in the first storage bucket.

13. The system of claim 8, wherein the computer-readable instructions cause the hardware processing unit to:

buffer the data items in the memory device and periodically flush the buffered data items from the memory device to the solid state storage device.

14. The system of claim 13, wherein the computer-readable instructions cause the hardware processing unit to:

maintain a first in-memory page of first data items from a first bucket and a second in-memory page of second data items from a second bucket;

at a first time when the first in-memory page becomes full, flush the first in-memory page of first data items to the solid state storage device by appending the first data items to other first data items from the first bucket that are already stored on the solid state storage device; and at a second time when the second in-memory page becomes full, flush the second in-memory page of second data items to the solid state storage device by appending the second data items to other second data items from the second bucket that are already stored on the solid state storage device.

15. A system comprising:

a solid state storage device having multiple storage blocks;

a solid state storage device controller; and a hardware processing unit configured to:

receive data items for storage on the solid state storage device;

determine different levels for the data items, wherein the different levels determine when the data items expire and are deleted from the solid state storage device;

assign the data items to different storage buckets of a bucket file based on the levels;

direct the solid state storage device controller to append the data items within the different storage buckets on the solid state storage device such that individual storage buckets of data items are clustered together in corresponding blocks of the solid state storage device;

maintain corresponding numbers of the data items in the different storage buckets so that the corresponding numbers of the data items in the different storage buckets progressively decrease by level; and direct the solid state storage device controller to periodically delete largest storage buckets from the solid state storage device via one or more block erase operations while at least some other storage buckets remain stored on the solid state storage device, the largest storage buckets having greater numbers of the data items than the other storage buckets that remain stored on the solid state storage device.

16. The system of claim 15, wherein the hardware processing unit is configured to:

make periodic determinations that a size of the bucket file has reached a threshold; and direct the solid state storage device controller to periodically delete the largest storage buckets responsive to the periodic determinations.

17. The system of claim 15, wherein the corresponding numbers of the data items of the different storage buckets are exponentially decreasing.

18. The system of claim 17, wherein the other storage buckets that remain stored on the solid state storage device comprise a random sample of evolving, incoming data items received by the system.

19. The system of claim 15, wherein the solid state storage device is a flash storage device.

* * * * *